United States Patent [19]

Andreini et al.

[11] Patent Number: 5,448,636
[45] Date of Patent: Sep. 5, 1995

[54] DEVICE FOR LIMITING THE WORKING VOLTAGE MECHANICAL SWITCHES IN TELEPHONY

[75] Inventors: Antonio Andreini; Pietro Consiglio; Pietro Erratico, all of Milan; Enrico M. A. Ravanelli, Monza, all of Italy

[73] Assignee: SGS-Thomson Microelectronics S.R.L., Agrate Brianza, Italy

[21] Appl. No.: 17,789

[22] Filed: Feb. 16, 1993

[30] Foreign Application Priority Data

Feb. 17, 1992 [IT] Italy .................. MI92A0339

[51] Int. Cl.⁶ .............................................. H04M 1/00
[52] U.S. Cl. .................... 379/422; 379/377; 379/387; 379/412
[58] Field of Search ............... 379/387, 372, 377, 422, 379/373, 394, 412

[56] References Cited

U.S. PATENT DOCUMENTS

| | | | |
|---|---|---|---|
| 4,360,710 | 11/1982 | Chaput et al. | 379/412 |
| 4,475,012 | 10/1984 | Gulmance . | |
| 4,634,814 | 1/1987 | Pommer, II | 379/377 |
| 4,847,899 | 7/1989 | Hikida | 379/387 |
| 4,896,352 | 1/1990 | Dabin | 379/387 |
| 5,121,425 | 6/1992 | Reichelt | 379/387 |

FOREIGN PATENT DOCUMENTS 3538088  4/1987  Germany .
3623017  1/1988  Germany .

*Primary Examiner*—James L. Dwyer
*Assistant Examiner*—Jack Chiang
*Attorney, Agent, or Firm*—Wolf, Greenfield & Sacks

[57] ABSTRACT

Device for limiting the working voltage for mechanical switches in telephony includes terminals for connection to a telephone line, a connection and power supply branch for a control circuit extending from a first terminal, the branch having a first switch, the cathode terminal of a first Zener diode and the source terminal of a first MOSFET transistor being connected to the output terminal of the first switch, the gate terminal of the first MOSFET transistor being connected, through the anode terminal of the Zener diode, to the first terminal. The current absorbed by the device may be adjusted.

25 Claims, 2 Drawing Sheets a) PRIOR ART b) PRIOR ART

DEVICE FOR LIMITING THE WORKING VOLTAGE MECHANICAL SWITCHES IN TELEPHONY

BACKGROUND OF THE INVENTION

1. Field of the Invention

The present invention relates to a device for limiting the working voltage for mechanical switches in telephony.

2. Discussion of the Related Art

As is known, a switch, technically termed a "hook" is used in telephone sets to connect the telephone set itself to the telephone line when the handset is lifted. This hook carries, when activated, a line current which in some cases reaches a value of 120 milliamperes.

Traditionally, in electromechanical sets the hook comprised an actual mechanical switch, as better explained hereinafter. In recent times the mechanical switch has been completely or partially replaced with electronic switches, such as bipolar transistors or MOSFET transistors, due both to their lower costs and to their higher reliability, which is the result of the elimination of problems related to the oxidation of the contacts of the switch due to sparking, and other minor problems.

However, in order to drive these electronic switches it is still necessary to use a mechanical or magnetic switch to detect the lifting of the handset from its normal on-hook state.

In this case one obtains the simplification of the mechanical switch, of the simple-contact type, as well as the reduction of the currents which flow through the switch itself, which can be estimated in the range of a few microamperes.

The voltage that in any case remains applied across these switches, when the switch is open, is equal to the voltage present on the telephone line. In some cases, this line voltage can be of several hundred volts, for example in the case of a call as signal for the ringer or during tests performed on telephone lines, and is limited only by the value set by the circuit which protects against atmospheric discharges, i.e. lightning.

In the presence of such high voltage values it is currently necessary to follow precautions, since the humidity of the air can cause the false closure of the switch due to a significant reduction in insulation and thus produce a false closure detection which thus causes an associated actual closure of the electronic line switch.

An object of the present invention is to eliminate or substantially reduce the problems described above by providing a device for limiting the working voltage for mechanical switches in telephony, which device limits the voltage across the mechanical switches present in electronic sets in order to eliminate false closure signals.

Another object of the present invention is to provide a limiting device that allows the use of low voltage/current switches.

Yet another object of the present invention is to provide a limiting device which is highly reliable, relatively easy to manufacture and has a competitive cost.

SUMMARY OF THE INVENTION

The objects mentioned and others which will become apparent hereinafter are achieved by a device for limiting the working voltage for mechanical switches in telephony, including terminals for connection to a telephone line, a connection and power supply branch for a control circuit coupled to a first terminal and having a first switch including an output terminal, a first Zener diode having a first cathode terminal coupled to the output terminal, a first MOSFET transistor having a source terminal coupled to the output terminal, a gate terminal coupled to an anode terminal of the first Zener diode and the first terminal, and means, which may include resistors, transistors, or combinations of resistors and transistors, for controlling a current consumed by the device.

Further characteristics and advantages of the invention will become apparent from the description of some preferred but not exclusive embodiments of a device for limiting the working voltage for mechanical switches in telephony, according to the invention, which are illustrated only by way of non-limitative example in the accompanying drawings.

DETAILED DESCRIPTION

Figure 1:
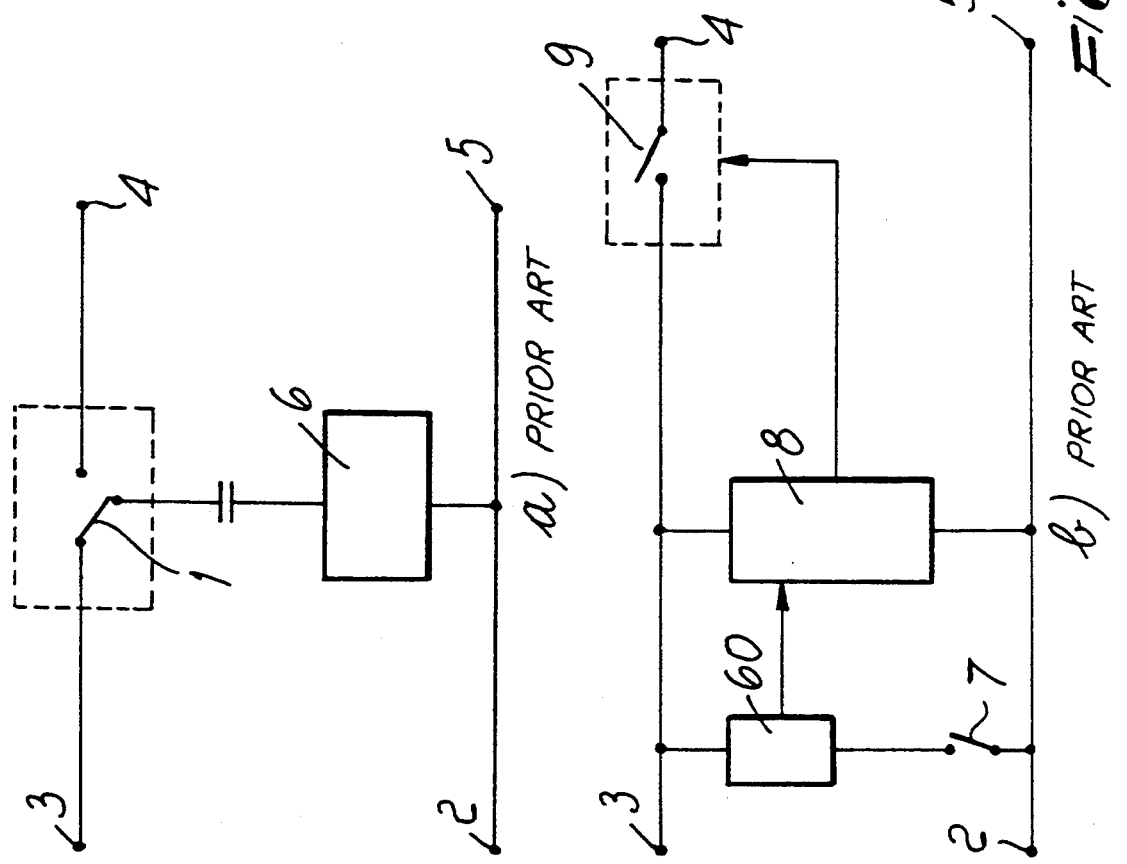
FIG. 1a is a known circuit diagram of an electromechanical circuit with mechanical connection switch for telephony.
FIG. 1b is a known circuit diagram of a circuit with an electronic connection switch for telephony.

With reference to FIGS. 1a and 1b, a mechanical switch 1 was traditionally used for the hook of a telephone; said switch alternatively selected connection between the terminals 2 and 3 of a telephone line or to the terminals 4 and 5 of a talk circuit or to a ringer 6. As illustrated in FIG. 1b, by using electronic switches, coupled with simple mechanical switches, the telephone line, at terminals 2 and 3, is connected to a "start" circuit 60 by means of a simple switch 7 which, through a simple switch 9 which cooperates with a control circuit 8, allows for connection of the talk circuit at terminals 4 and 5.

Figure 2:
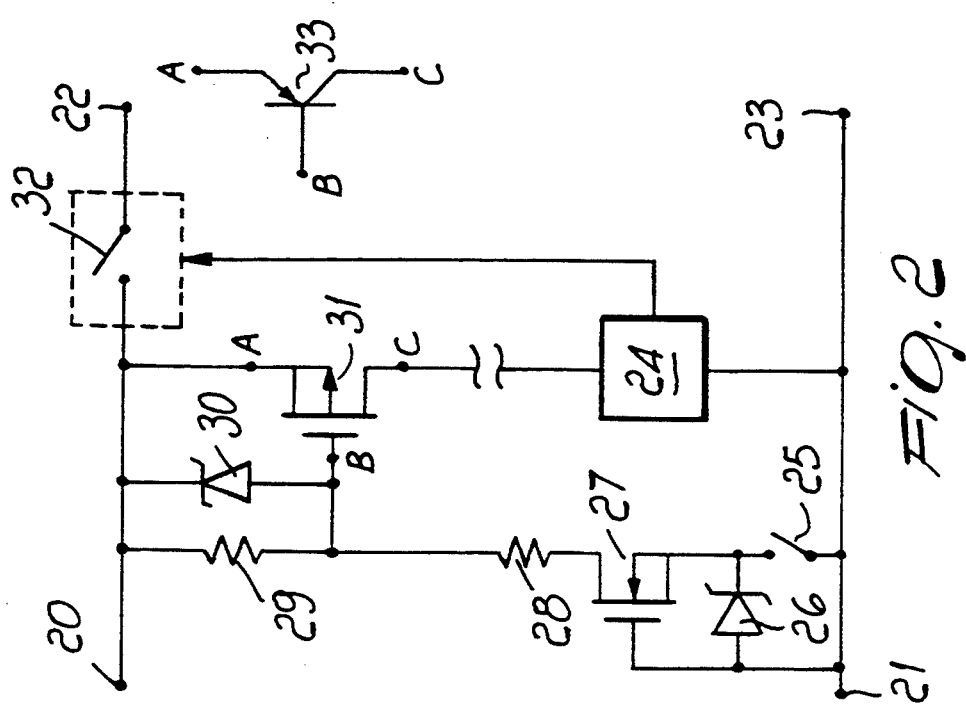
FIG. 2 is a circuit diagram of a first embodiment of a limiting device according to the invention.

With reference to FIG. 2, a device for limiting the working voltage for mechanical switches in telephony in accordance with the present invention comprises terminals 20 and 21 for connection to a telephone line and terminals 22 and 23 for connection to a talk circuit.

A connection and power supply branch for a control circuit 24 extends from a first terminal 21 and has a first switch 25. The cathode terminal of a first Zener diode 26 and the source terminal of a first MOSFET transistor 27 are connected to the output terminal of said first switch 25. The gate terminal of said first MOSFET transistor is connected, through the anode terminal of the first Zener diode 26, to the first terminal 21. Means are provided for adjusting the current absorbed by the device, as will become apparent hereinafter.

The first MOSFET transistor 27 is a depletion transistor, technically termed "depletion MOSFET". The same reference numerals are kept hereinafter for identical components.

In the first embodiment illustrated in FIG. 2, the means for adjusting the absorbed current comprise a first resistor 28 that is coupled in series with the drain terminal of the first transistor 27 and a second resistor 29 that is coupled in series with the first resistor 28 and is connected to a second terminal 20 of the telephone line.

The anode terminal of a second Zener diode 30 is connected between the first resistor 28 and the second resistor 29 and the cathode terminal of Zener diode 30 is connected to the second terminal 20 of the telephone line.

The gate terminal of a second MOSFET transistor 31 is connected to the anode terminal of the second Zener diode 30 and a terminal of the control circuit 24 is connected to the drain terminal of said second MOSFET transistor. The control circuit 24 controls a second switch 32 which comprises an appropriately connected transistor.

The first switch 25, which is mechanical, is sized, when open, for a working voltage set by the first Zener diode 26, and no current can flow into the first transistor 27 and thus the second transistor 31 is off. This situation is optimum, since no absorption is tolerable in the on-hook state.

The value of the first Zener diode 26 must be such as to ensure the off state of the first transistor 27.

When the first switch 25 is closed, i.e. when the handset is lifted, i.e. in the off-hook state, the first transistor 27 starts to conduct and causes a drop in the voltage across the second resistor 29 and thus the conduction of the second transistor 31. This situation, once processed by the control circuit 24, causes the conduction of the second switch 32, which as mentioned earlier comprises a transistor.

The value of the current absorbed by the telephone line is mainly determined by the voltage applied to the line and by the value of the sum of the resistances of the first resistor 28 and of the second resistor 29, in the initial state, and subsequently, in the steady state, by the value of the resistance of the first resistor 28 alone. The current is practically not limited through the second transistor 31 except by the value of the voltage drop across the second resistor 29 and by the constructive characteristics of the second transistor 31. From a practical point of view, the second transistor 31 acts as a switch.

In a second embodiment, the second transistor 31, arranged between the terminals A, B and C of the circuit of FIG. 2, can be replaced with a first PNP bipolar transistor 33 without altering the above described functions of the circuit.

Figure 3:
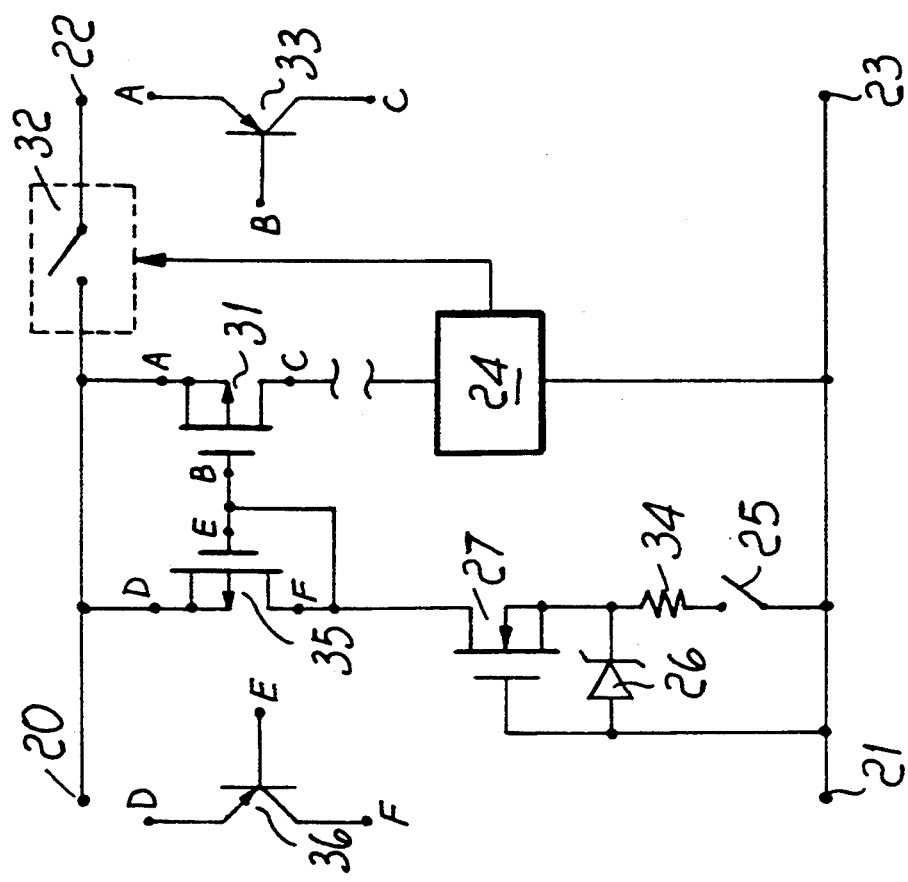
FIG. 3 is a circuit diagram of a second embodiment of a limiting device according to the invention.

In a third embodiment, as illustrated in FIG. 3, a third resistor 34 is arranged in series to the source terminal of the first transistor 27 and to the cathode terminal of the first Zener diode 26, and is connected to the first switch 25. In this situation, it is possible to eliminate the first resistor 28 and the second resistor 29, advantageously replacing them with a third MOSFET transistor 35 wherein the drain terminal is connected to the drain terminal of the first transistor 27, the source terminal is connected to the second terminal 20 of the telephone line and the gate terminal is connected to the drain terminal and to the gate terminal of the second transistor 31.

In this case, the current which flows in the first transistor 27, which is a function of the threshold voltage of said first transistor and of the resistance of the third resistor 34, also flows in the second transistor 31 and in the third transistor 35, and except for possible different area ratios among the transistors, obtains a substantially constant current consumption, i.e. dissipated power level, of the telephone line for any value of the voltage present on the terminals 20 and 21.

Without loss of generality, the second MOSFET transistor 31, at terminals A, B and C, can be replaced with the first PNP bipolar transistor 33, while the third MOSFET transistor 35, at terminals D, E and F, can be replaced with a second PNP bipolar transistor 36, while maintaining the above described functions.

In particular, the first MOSFET transistor 27 can be produced, so that it is integrated with the other above described components, with the Multipower BCD250 process, for example, deriving it from a lateral power MOSFET transistor, technically termed "LDMOS" wherein doping with a dopant, preferably arsenic, is performed prior to gate oxidation in an appropriate dose in order to provide negative threshold control of transistor 27.

Figure 4:
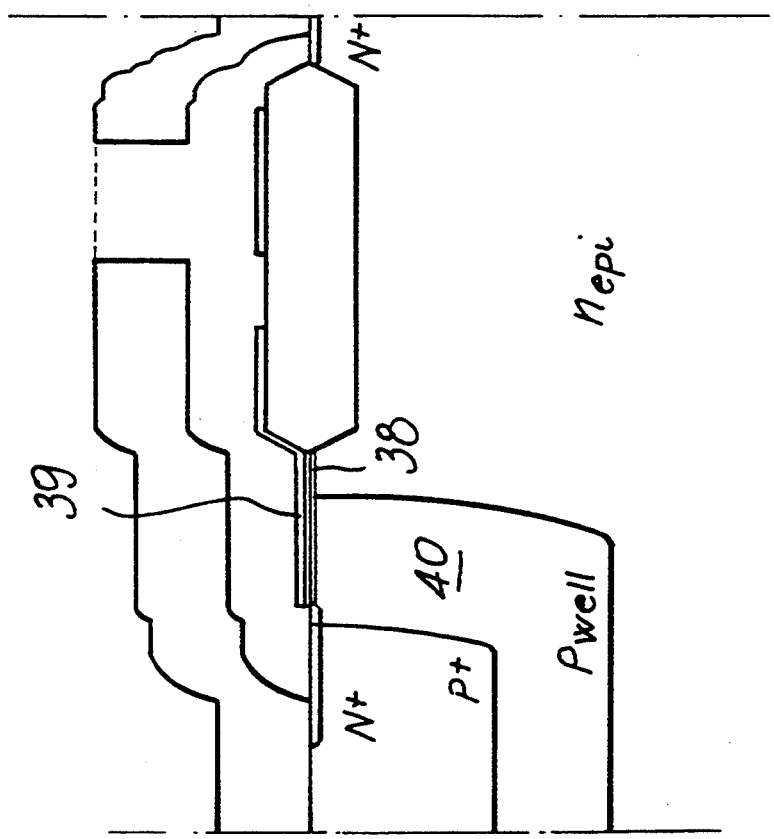
FIG. 4 is a sectional front elevation view of a portion of a MOSFET depletion transistor.

With reference to FIG. 4, the doping is designated, in the standard structure of the LDMOS, by the reference numeral 38. Accurate control of the dose of the doping, which is normally performed by implantation, and of the diffusion in the body of the device is necessary in order to ensure negative threshold voltages in the range of a few volts without compromising the breakdown voltage of said first transistor 25.

The threshold voltage of the first transistor 27 must be smaller, in absolute value, than the Zener voltage of the first diode 26 in order to ensure proper functioning of the circuits described earlier with reference to FIGS. 2 and 3. In particular, the so-called "P-well" diffusion 40 of the BCD250 process has been chosen as the diffusion. This diffusion is produced prior to the deposition of a layer 39 of polysilicon that defines the gate terminal of the first transistor 27.

The first transistor 27 thus has a body diffusion 40 that is not self-aligned with the layer 39 gate terminal. This diffusion, which differs from the conventional diffusion of transistors produced with the BCD250 process, allows low arsenic doping doses in order to control low thresholds. This leads to particularly high breakdown voltages of the transistor even for negative threshold voltages in the range of a few volts.

Practical tests have shown that the invention achieves the intended aim and objects, making the dissipated power practically constant, independently of the voltage across the terminals 20 and 21 of the telephone line, furthermore advantageously allowing correct operation in the presence of any biasing of the telephone line.

The invention thus conceived is susceptible to numerous modifications and variations, all of which are within the scope of the inventive concept. All the details may furthermore be replaced with other technically equivalent elements.

In practice, the materials employed, as well as the dimensions, may be any according to the particular application requirements.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. A device for limiting a working voltage for mechanical switches in telephony, comprising:
   terminals for connection to a telephone line;
   a connection and power supply branch for a control circuit coupled to a first terminal and having a first switch including an output terminal, a first zener diode having a first cathode terminal coupled to the output terminal, a first MOSFET transistor having a source terminal coupled to the output terminal, a gate terminal coupled to an anode terminal of the first zener diode and the first terminal; and
   means for adjusting a current absorbed by the device.

2. The limiting device of claim 1, wherein the MOSFET transistor is a depletion transistor.

3. The limiting device of claim 1, wherein the means for adjusting the absorbed current comprises:
   a first resistor and a second resistor coupled in series between a drain terminal of the first MOSFET transistor and a second terminal;
   a second zener diode having an anode terminal coupled to a junction of the first resistor and the second resistor and a cathode terminal coupled to the second terminal;
   a second MOSFET transistor having a gate terminal coupled to the anode terminal of the second zener diode, a source terminal coupled to the second terminal, and a drain terminal coupled to a terminal of the control circuit.

4. The limiting device of claim 2, wherein the means for adjusting the absorbed current comprises:
   a first resistor and a second resistor coupled in series between a drain terminal of the first MOSFET transistor and a second terminal;
   a second zener diode having an anode terminal coupled to a junction of the first resistor and the second resistor and a cathode terminal coupled to the second terminal;
   a first bipolar transistor having a base terminal coupled to the anode terminal of the second zener diode, an emitter coupled to the second terminal, and a collector terminal coupled to a terminal of the control circuit.

5. The limiting device of claim 2, wherein the means for adjusting the absorbed current comprises:
   a third MOSFET transistor having a drain terminal coupled to a drain terminal of the first MOSFET transistor, a source terminal coupled to the second terminal, a gate terminal and the drain terminal of the third MOSFET transistor coupled to a gate terminal of a second MOSFET transistor having a source terminal coupled to a terminal of the control circuit and a drain terminal coupled to the second terminal.

6. The limiting device of claim 2, wherein the means for adjusting the absorbed current comprises:
   a second bipolar transistor having a collector terminal coupled to a drain terminal of the first MOSFET transistor, an emitter terminal coupled to the second terminal, a base terminal and the collector terminal of the second bipolar transistor coupled to a base terminal of a first bipolar transistor having an emitter terminal coupled to the second terminal and a collector terminal coupled to a terminal of the control circuit.

7. The limiting device according to claim 1 wherein the first MOSFET transistor is produced with the Multipower BCD250 process wherein, prior to gate oxidation, doping with an N-type dopant is performed to provide negative threshold control of the transistor.

8. The limiting device according to claim 7, wherein the first MOSFET transistor is a depletion mode transistor suitable to operate without compromising a maximum working voltage of the transistor.

9. A device for limiting a working voltage for mechanical switches in telephony, comprising:
   terminals for connection to a telephone line;
   a connection and power supply branch circuit coupled to a first terminal and having a first switch including an output terminal, a first zener diode having a first cathode terminal coupled to the output terminal, a first MOSFET transistor having a source terminal coupled to the output terminal, a gate terminal coupled to an anode terminal of the first zener diode and the first terminal; and
   a control circuit, coupled to the connection and power supply branch circuit, for controlling a current consumed by the device.

10. The limiting device of claim 9, wherein the MOSFET transistor is a depletion transistor.

11. The limiting device of claim 9, wherein the current control circuit comprises:
   a first resistor and a second resistor coupled in series between a drain terminal of the first MOSFET transistor and a second terminal;
   a second zener diode having an anode terminal coupled to a junction of the first resistor and the second resistor and a cathode terminal coupled to the second terminal;
   a second MOSFET transistor having a gate terminal coupled to the anode terminal of the second zener diode, a source terminal coupled to the second terminal, and a drain terminal coupled to a terminal of the control circuit.

12. The limiting device of claim 9, wherein the current control circuit comprises:
   a first resistor and a second resistor coupled in series between a drain terminal of the first MOSFET transistor and a second terminal;
   a second zener diode having an anode terminal coupled to a junction of the first resistor and the second resistor and a cathode terminal coupled to the second terminal;
   a first bipolar transistor having a base terminal coupled to the anode terminal of the second zener diode, an emitter coupled to the second terminal, and a collector terminal coupled to a terminal of the control circuit.

13. The limiting device of claim 9, wherein the current control circuit comprises:
   a third MOSFET transistor having a drain terminal coupled to a drain terminal of the first MOSFET transistor, a source terminal coupled to the second terminal, a gate terminal and the drain terminal of the third MOSFET transistor coupled to a gate terminal of a second MOSFET transistor having a source terminal coupled to a terminal of the control circuit and a drain terminal coupled to the second terminal.

14. The limiting device of claim 9, wherein the current control circuit comprises:
   a second bipolar transistor having a collector terminal coupled to a drain terminal of the first MOS- FET transistor, an emitter terminal coupled to the second terminal, a base terminal and the collector terminal of the second bipolar transistor coupled to a base terminal of a first bipolar transistor having an emitter terminal coupled to the second terminal and a collector terminal coupled to a terminal of the control circuit.

15. The limiting device according to claims 9, wherein the first MOSFET transistor is produced with the Multipower BCD250 process wherein, prior to gate oxidation, doping with an N-type dopant is performed to provide negative threshold control of the transistor.

16. The limiting device of claim 15, wherein the first MOSFET transistor is a depletion mode transistor that operates without exceeding a maximum working voltage of the transistor.

17. A device for limiting a working voltage for a mechanical telephone switchhook, the device comprising:
   first and second terminals for connection to a telephone line;
   a connection and power supply branch circuit coupled to the first terminal and including:
      a mechanical switch having an output terminal,
      a first zener diode having a first cathode terminal coupled to the output terminal,
      a first MOSFET transistor having a source terminal coupled to the output terminal, and a gate terminal coupled to an anode terminal of the first zener diode and to the first terminal;
   switching means for connecting the telephone line to a talk circuit; and
   a control circuit, coupled to the connection and power supply branch, for controlling the switching means.

18. The device of claim 17, wherein the switching means includes a switch and a control circuit for controlling said switch in the switching means.

19. The device of claim 17, wherein the MOSFET transistor is a depletion transistor.

20. The device of claim 17, wherein the control circuit comprises:
   a first resistor and a second resistor coupled in series between a drain terminal of the first MOSFET transistor and the second terminal;
   a second zener diode having an anode terminal coupled to a junction of the first resistor and to the second resistor, and a cathode terminal coupled to the second terminal; and
   a second MOSFET transistor having a gate terminal coupled to the anode terminal of the second zener diode, a source terminal coupled to the second terminal, and a drain terminal coupled to a terminal of the switching means.

21. The device of claim 17 wherein the control circuit comprises:
   a first resistor and a second resistor coupled in series between a drain terminal of the first MOSFET transistor and the second terminal;
   a second zener diode having an anode terminal coupled to a junction of the first resistor and to the second resistor, and a cathode terminal coupled to the second terminal;
   a first bipolar transistor having a base terminal coupled to the anode terminal of the second zener diode, an emitter terminal coupled to the second terminal, and a collector terminal coupled to a terminal of the switching means.

22. The device of claim 17, wherein the control circuit comprises a second MOSFET transistor and a third MOSFET transistor, the third MOSFET transistor having a drain terminal coupled to a drain terminal of the first MOSFET transistor, a source terminal coupled to the second terminal, and a gate terminal coupled to the drain terminal of the third MOSFET transistor and to a gate terminal of a second MOSFET transistor, the second MOSFET having a source terminal coupled to a terminal of the switching means, and a drain terminal coupled to the second terminal.

23. The device of claim 17, wherein the control circuit comprises:
   a second bipolar transistor having a collector terminal coupled to a drain terminal of the first MOSFET transistor, an emitter terminal coupled to the second terminal, a base terminal and the collector terminal of the second bipolar transistor coupled to a base terminal of a first bipolar transistor having an emitter terminal coupled to the second terminal and a collector terminal coupled to a terminal of the switching means.

24. The device of claim 17, wherein the first MOSFET transistor is produced by a process wherein, prior to gate oxidation, doping with an N-type dopant is performed to provide negative threshold control of the transistor.

25. The device of claim 24, wherein the first MOSFET transistor is a depletion mode transistor that operates without exceeding a maximum working voltage of the transistor.

* * * * *